United States Patent
Kibler

(10) Patent No.: US 9,475,419 B2
(45) Date of Patent: Oct. 25, 2016

(54) ROLL OFF TRAILER, MOVABLE BUMPER FOR USE THEREWITH AND RELATED METHODS

(71) Applicant: MAC TRAILER MANUFACTURING, INC., Alliance, OH (US)

(72) Inventor: Scott A. Kibler, Kensington, OH (US)

(73) Assignee: MAC TRAILER MANUFACTURING, INC., Alliance, OH (US)

( * ) Notice: Subject to any disclaimer, the term of this patent is extended or adjusted under 35 U.S.C. 154(b) by 0 days.

(21) Appl. No.: 14/844,112

(22) Filed: Sep. 3, 2015

(65) Prior Publication Data

US 2016/0068126 A1  Mar. 10, 2016

Related U.S. Application Data

(60) Provisional application No. 62/045,886, filed on Sep. 4, 2014.

(51) Int. Cl.
  *B60R 19/56* (2006.01)
  *B60P 1/28* (2006.01)
  *B60P 1/64* (2006.01)

(52) U.S. Cl.
  CPC .............. *B60P 1/28* (2013.01); *B60R 19/56* (2013.01); *B60P 1/6454* (2013.01)

(58) Field of Classification Search
  CPC . B60R 19/38; B60R 19/56; B60R 2021/002; B60R 2021/0069; B60P 1/28; B60P 1/6454
  USPC ........................................................ 293/118
  See application file for complete search history.

(56) References Cited

U.S. PATENT DOCUMENTS 5,967,735 A  10/1999  Smart et al.
2001/0030431 A1  10/2001  Killday

*Primary Examiner* — Gregory Blankenship
(74) *Attorney, Agent, or Firm* — Sand & Sebolt

(57) ABSTRACT

A roll off trailer is provided with a bumper assembly which may move between a deployed position and a collapsed position. The roll off trailer may include a trailer frame with a table top pivotally connected to the trailer such that the deployed position may be associated with a home position of the table top and the collapsed position may be associated with a tilted roll off position of the table top.

21 Claims, 9 Drawing Sheets

ROLL OFF TRAILER, MOVABLE BUMPER FOR USE THEREWITH AND RELATED METHODS

CROSS-REFERENCE TO RELATED APPLICATION

This application claims priority from U.S. Provisional Application Ser. No. 62/045,886, filed Sep. 4, 2014, the disclosure of which is incorporated herein by reference.

BACKGROUND

1. Technical Field

The technical field relates generally to trailers for hauling a container. More particularly, the technical field relates to a roll off trailer having a rear bumper having deployed and collapsed positions.

2. Background Information

Roll off trailers are known generally in the art and include a frame having a forward end having a hitch attachment for attaching to a tractor vehicle and a rear end including a suspension assembly and ground engaging wheels for rollingly engaging a road surface. Roll off trailers include a table top which may pivot from a generally horizontal home position to a tilted position such that the front end of the table top may move up while the rear end of the table top moves down, and to pivot in the opposite direction from the tilted to the home position. The pivotal movement of the table top facilitates loading a container sitting on the ground onto the table top and unloading a container from the table top onto the ground. When loaded on the table top, a tractor or other towing vehicle which tows the trailer may haul the container away. Current rear bumpers on roll off trailers may be problematic in that when the table top pivots from the home position to the tilted position, the bumper may contact the ground, causing damage to both the trailer and the ground surface, such as asphalt or concrete.

SUMMARY

In one aspect, a roll off trailer may comprise a trailer frame having a rear end; a table top pivotally connected to the trailer frame adjacent the rear end so that the table top is pivotable between a generally horizontal home position and a tilted roll off position; a bumper assembly which extends below the table top adjacent the rear end of the trailer frame and is movable between a deployed position and a collapsed position; and a linkage assembly which is mounted on the bumper assembly and controls orientation of the bumper assembly as the table top moves from the home position to the roll off position and the bumper assembly moves from the deployed position to the collapsed position.

In another aspect, a roll off trailer may comprise a trailer frame having a rear end; a table top pivotally connected to the trailer frame about a first axis adjacent the rear end; a bumper assembly pivotally connected to the table top about a second axis; and a linkage assembly pivotally connected to the trailer frame about a third axis and pivotally connected to the bumper assembly about a fourth axis.

In another aspect, a method may comprise the steps of providing a roll off trailer comprising a trailer frame, a table top pivotally connected to the trailer frame adjacent a rear end of the trailer, a bumper assembly comprising a bumper, and a linkage assembly pivotally connected to the trailer frame and pivotally connected to the bumper assembly; and pivoting the table top relative to the trailer frame so that a rear end of the table top moves downward relative to the trailer frame and the bumper and rear end of the table top move closer to one another.

BRIEF DESCRIPTION OF THE SEVERAL VIEWS OF THE DRAWINGS

A sample embodiment is set forth in the following description, is shown in the drawings and is particularly and distinctly pointed out and set forth in the appended claims.

Similar numbers refer to similar parts throughout the drawings.

DETAILED DESCRIPTION

Figure 1:
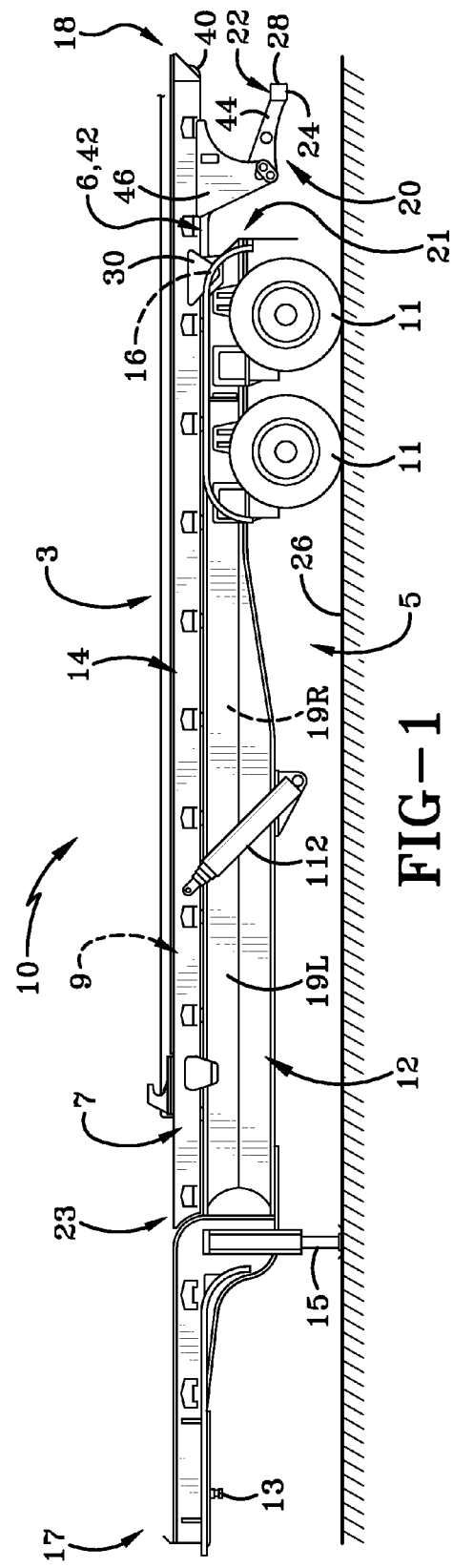
FIG. 1 is a left side elevation view of a roll off trailer with the table top in a generally horizontal home position and the bumper assembly in a deployed position.

As depicted in FIG. 1, a roll off trailer 10 may comprise a trailer frame 12, a table top 14 pivotally connected to frame 12, a bumper assembly 20 and a linkage assembly 6. Trailer 10 and frame 12 may have a top 3, a bottom 5, left and right sides 7 and 9 defining therebetween an axial or lateral direction, and front and rear ends 17 and 18 defining therebetween a longitudinal direction. Table top 14 may be pivotally connected to frame 12 adjacent rear end 18 to pivot relative to frame 12. Bumper assembly 20 may be adjacent rear end 18 below table top 14. Linkage assembly 6 may be below table top 14 and extend forward from bumper assembly 20.

Trailer 10 may include ground-engaging wheels 11 which are rotatably mounted on frame 12 adjacent rear end 18 and engage the surface of the ground to allow trailer 10 to roll along the ground or roadway. Trailer 10 may include a hitch member 13 which may be hitched to a hitch member of a tractor or other towing vehicle to allow trailer 10 to be towed by the towing vehicle. Trailer 10 may also include retractable landing gear 15 adjacent the front end 17 so that landing gear 15 in a lowered position may contact the ground to support front end 17 of trailer 10 when trailer 10 is not hitched to a towing vehicle and landing gear 15 in a raised position may be out of contact with the ground to allow for rolling movement of trailer 10 as when hitched to and being towed by a towing vehicle.

As discussed in greater detail, further below, frame 12 may include rails 19, brackets 31, brackets 32, brackets 52, sleeves or collars 37 and 86; table top 14 may include rails 38, brackets 30, brackets 46, sleeves or collars 35, crossbar 90, plate 25 and collar 104; bumper assembly 20 may include a bumper 22, support arms 44, a crossbar 64, a support flange 92, support arms 94, sleeves or collars 96, 102 and 106; and linkage assembly 6 may include a link 42, sleeves or collars 84 and 108, and shafts 54 and 58.

Table top 14, bumper assembly 20 and linkage assembly 6 may be pivotable relative to frame 12 and one another about axles, shafts, rods or pivot pins having respective central axes. For instance, trailer 10 may include axles, shafts, pivot shafts, rods, pivots or pivot pins 34, 54, 58 and 60 having respective axes 36, 56, 62 and 76, each of which may extend in the lateral or axial direction and be essentially horizontal. Axes 36, 56, 62 and 76 may be essentially parallel to and offset from one another and the axes about which wheels 11 rotate. Pivot pins 34, 54, 58 and 60 may be rigid, be formed of a suitable metal, may extend in the lateral or axial direction, may be essentially horizontal, and may be essentially straight and essentially parallel to and offset from one another.

Figure 5:
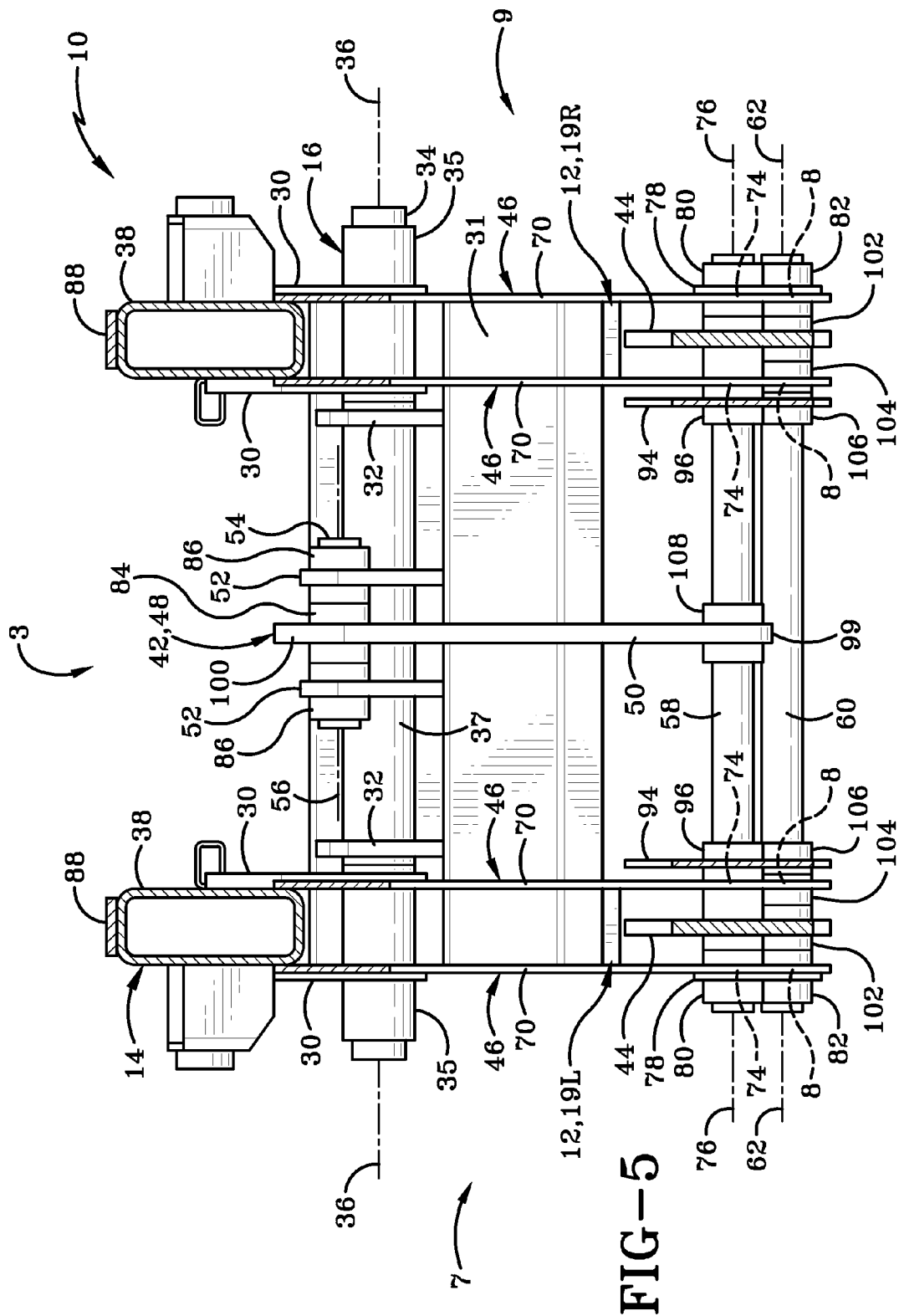
FIG. 5 is an enlarged cross section view looking forward taken on line 5-5 of FIG. 2 with the crossbar and strengthening plate of the bumper assembly mounting structure removed to allow a view of components forward thereof.

Various collars may be provided to receive therein one of these pivot pins or shafts, for instance, collars 35, 37, 80, 82, 84, 86, 96, 102, 104, 106 and 108, which are shown in FIG. 5 and other figures, which may be formed of an aluminum alloy or another suitable metal and which may be in the form of cylindrical tubes each defining a passage for receiving a respective pin or shaft. Pin or shaft 34 may be received in left and right collars 35 and collar 37. Pin or shaft 54 may be received in left and right collars 86 and collar 84. Pin or shaft 58 may be received in left and right collars 80, left and right collars 96 and collar 108. Pin or shaft 60 may be received in left and right collars 82, left and right collars 102, left and right collars 104 and left and right collars 106.

Figure 7:
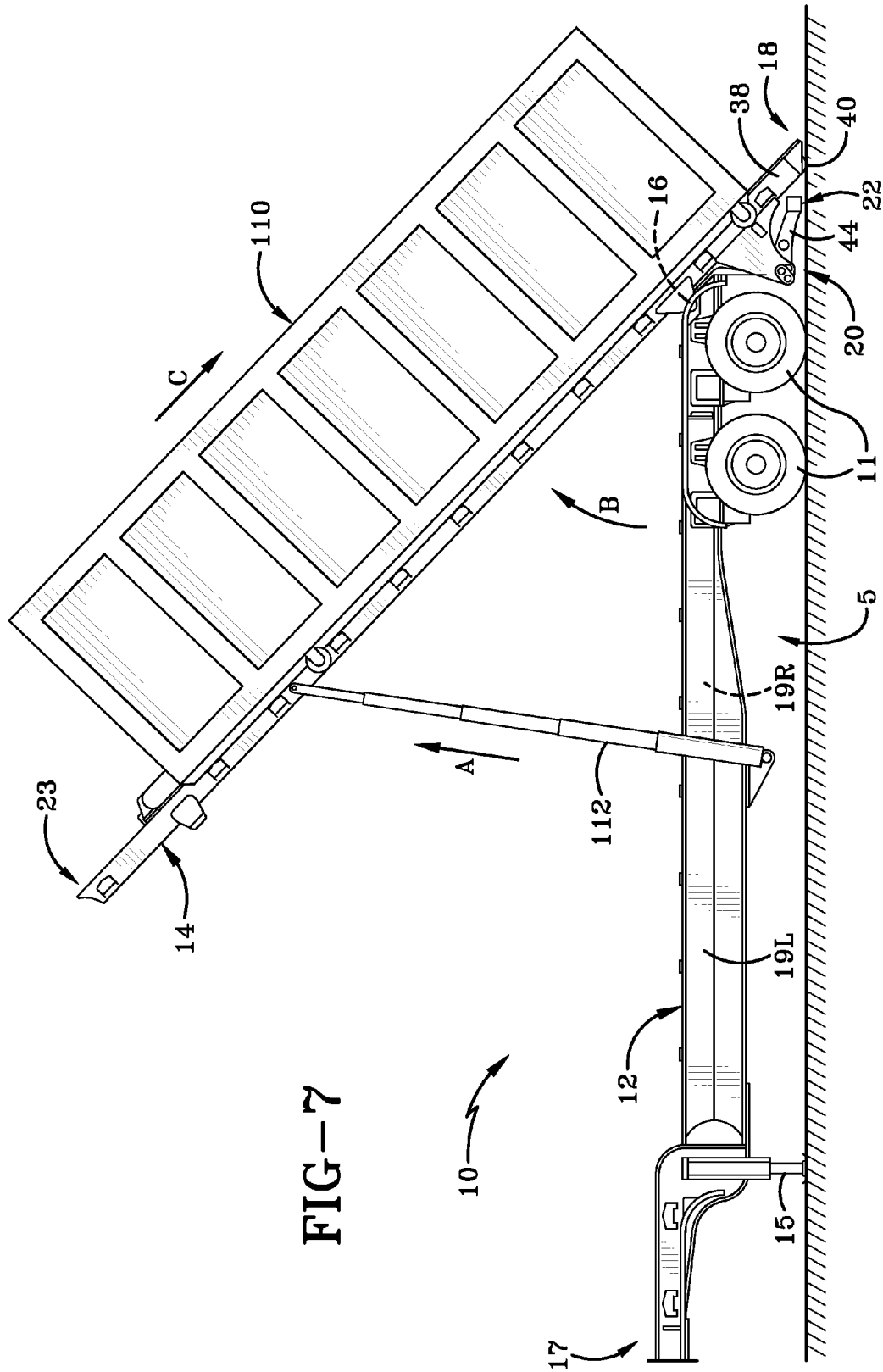
FIG. 7 is a left side elevation view of the trailer depicting the table top in the tilted roll off position and the bumper assembly in the collapsed position.
Figure 9:
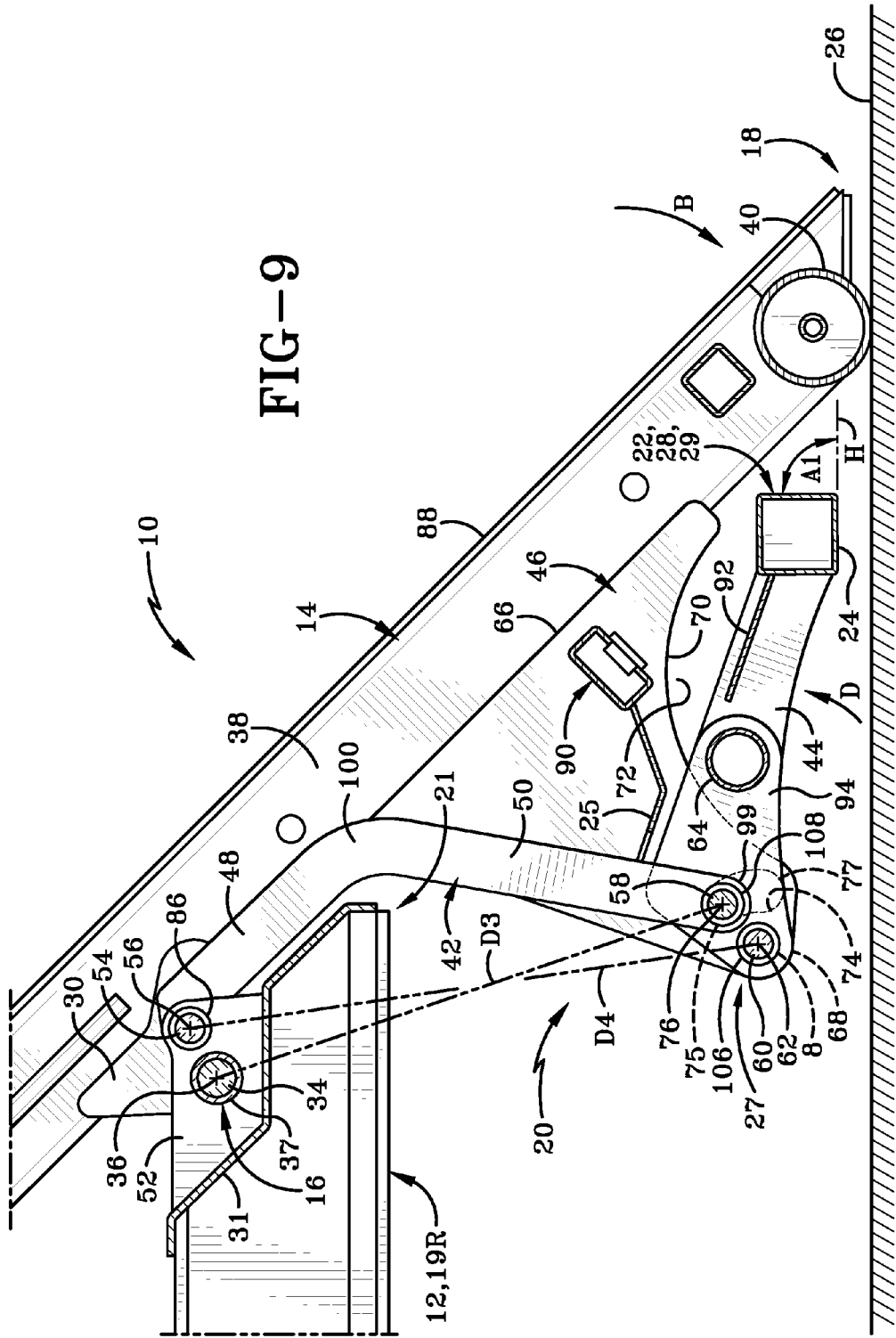
FIG. 9 is a cross section view similar to FIG. 4 and FIG. 8 depicting the table top in the roll off position and the bumper assembly in the collapsed position.

Table top 14 may be directly pivotally connected to frame 12 at pivot 34 to pivot about table top pivot axis 36 between multiple positions including a lowered or generally horizontal home position (FIGS. 1, 2) and a raised or generally angled or tilted roll off position (FIGS. 7, 9). In the home position, table top 14 is positioned for transporting a container seated atop table top 14 and the top surface of table top 14 faces upwardly and may be essentially horizontal. In the roll off position, table top 14 is suited for allowing a container to roll off the back end of table top 14 and the top surface of table top 14 faces upward and rearward with the front end of table top 14 raised and the back end of table top 14 lowered relative to the position of said front and rear ends in the home position. For instance, the top surface of table top 14 in the roll off position may be tilted relative to horizontal at an angle in a range of about 20, 25, 30 or 35 degrees to about 45, 50, 55 or 60 degrees as viewed from the side of table top 14/trailer 10.

Bumper assembly 20 may be movable between various positions and may be directly pivotally connected to table top 14 via pivot 60 to pivot about bumper assembly pivot axis 62 relative to frame 12, table top 14 and linkage assembly 6 between a home position or extended position or deployed position (FIGS. 1, 2, 4) and a retracted position or collapsed position (FIGS. 7, 9). The bumper deployed position may be associated with the table top first or home position and the bumper collapsed position may be associated with the table top second or tilted position. That is, bumper assembly 20 may be in the deployed position when table top 14 is in the home position and in the collapsed position when table top 14 is in the tilted roll off position.

Figure 3:
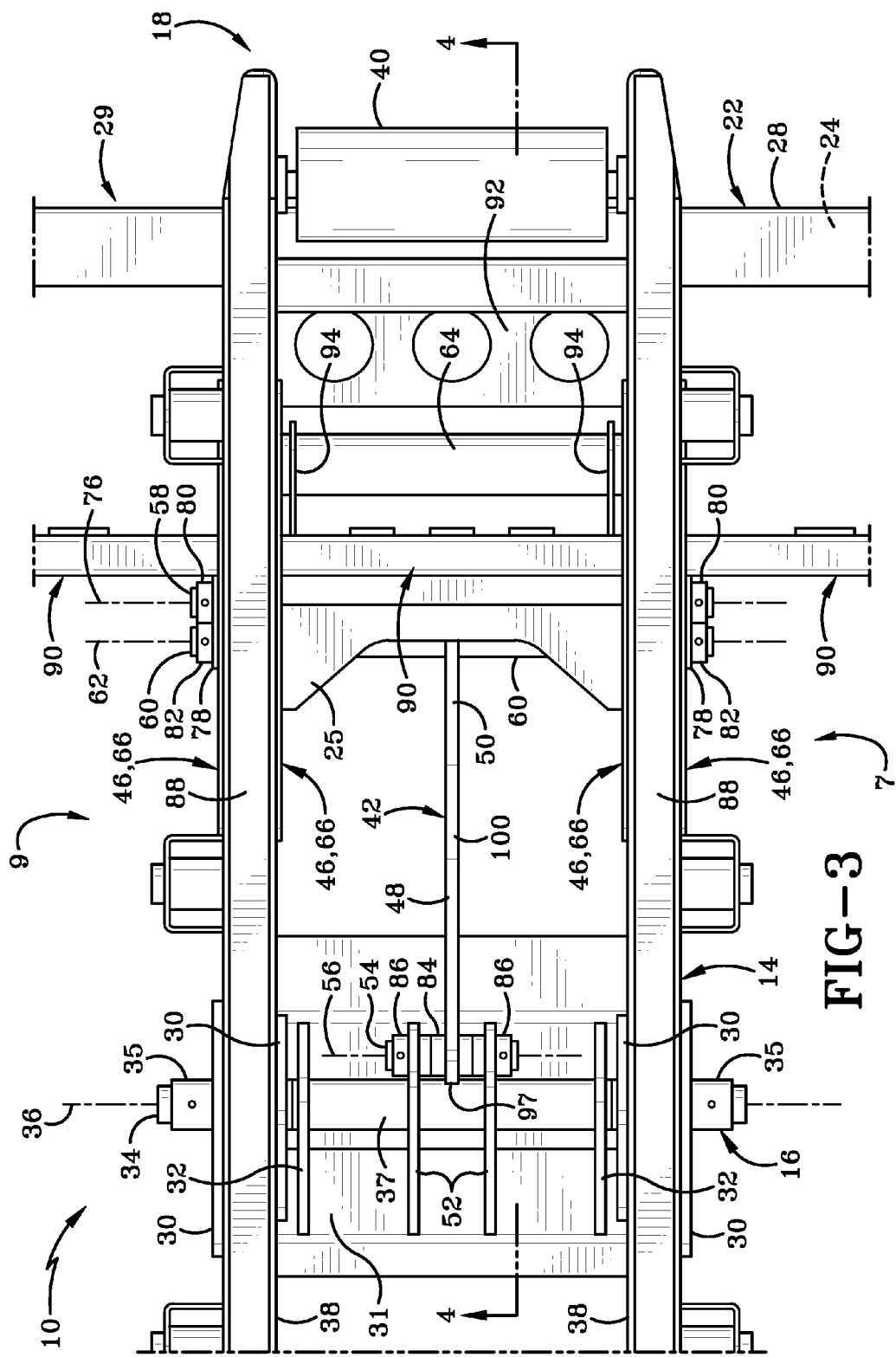
FIG. 3 is an enlarged top plan view of the rear portion of the trailer taken on line 3-3 of FIG. 2.

Frame 12 may include left and right longitudinally elongated frame rails 19L and 19R, which may be essentially parallel to one another and which may extend rearward, from adjacent front end 17 or landing gear 15 to adjacent wheels 11 and a rear end 21 of frame 12 which may be adjacent and forward of rear end 18 of trailer 10/table top 14. Frame 12 may further include a mounting bracket 31 which extends axially between and is rigidly secured to rails 19 adjacent rear end 18 of frame 12 and rails 19. Frame 12 may include left and right mounting brackets 32 which may be essentially vertical parallel plates, which may be rigidly secured to and extend upwardly from plate or bracket 31 adjacent rear end 21, which may be respectively adjacent left and right rails 19L and 19R and which as viewed from above (FIG. 3) may be between rails 19L and 19R. Frame 12 may further include mounting brackets 52 which may be essentially vertical plates which may be parallel to one another and plates 32, which may be rigidly secured to and extend upwardly from plate 31 adjacent rear end 21, and which may as viewed from above (FIG. 3) be between rails 19L and 19R and between brackets 32. Plates/bracket 52 may be directly between plates/brackets 32. Frame 12 may also include a rigid axially elongated tube or sleeve 37 which may extend between and be rigidly secured to plates or brackets 32 and 52. Sleeve 37 may extend through holes formed in plates/brackets 32 and 52 and may be welded thereto. Frame 12 may also include left and right collars 86, which may be rigidly secured respectively to left and right brackets 52. Each of rails 19, brackets 31, brackets 32, brackets 52, sleeve 37 and collars 86 may be rigid and may be formed of a metal such as an aluminum alloy or other metal known in the art.

Table top 14 may have a front end 23 and a back or rear end represented by back or rear end 18 of trailer 10. Table top 14 may be longitudinally elongated between ends 23 and 18. Front end 23 may be adjacent landing gear 15, generally adjacent and rearward of front end 17 and hitch member 13 and distal rear end 18 and rear end 21. Table top 14 may include left and right longitudinally elongated rails 38, left and right longitudinally elongated pads 88 secured respectively atop left and right rails 38, left and right sets or pairs of mounting brackets 30, left and right sleeves or collars 35, and a bumper assembly mounting structure 4 which may be rigid and may include left and right sets or pairs of support lobes or bumper assembly mounting brackets 46, a laterally or axially elongated crossbar 90, a strengthening plate 25 and left and right sleeves or collars 104. Each of rails 38, brackets 30, brackets 46, sleeves 35, crossbar 90, plate 25 and collar 104 may be rigid and may be formed of a metal such as an aluminum alloy or other metal known in the art.

Rails 38 may be in the form of box rails or other known types of rails and configured to support a container thereon, which may be seated on pads 88. Rails 38 may be essentially parallel and may define or extend along left and right sides 7 and 9 of trailer 10. A rear end roller 40 may be rotatably mounted on table top 14 adjacent rear end 18 of table top 14/trailer 10, may extend between rails 38, and may rotate about an axially extending essentially horizontal axis. The axis about which roller 40 is rotatable may be essentially parallel to axes 36, 56, 62 and 76 and to the axes about which wheels 11 rotate. Roller 40 may be laterally or axially elongated.

A sample table top having a pair of rails is disclosed in two other patent applications owned by this applicant and filed on the same date as the present application, entitled "Roll Off Trailer Frame And Two Trolley Assemblies" and "Roll Off Trailer Having A Stepped Out Front End Or Neck," the entirety of each being incorporated by reference as if fully rewritten herein. A sample frame 12 of the present invention may be found in these references as well. A container lifting or actuator system (not entirely shown herein), which may comprise a hydraulic actuator (as noted further below) suitable to drive pivotal movement of table top 14 relative to frame 12 via pivotal connection 16 as one having ordinary skill in the art would understand. A sample actuator system may be found in the above noted applications.

Brackets 30 may be rigidly secured to and extend downwardly from rails 38. Brackets 30 may be formed as vertical plates which may be parallel to one another and to brackets/plates 32 and 52. Brackets 30 may be adjacent and forward of rear end 21 of frame 12, and adjacent and spaced upwardly of plate/bracket 31. Brackets 30 may include a left bracket or a pair of left brackets 30 secured to and extending downwardly from left rail 38. Where there is a set or pair of left brackets 30, they may be secured respectively to the left and right sides of left rail 38. Similarly, brackets 30 may include a right bracket or a pair of right brackets 30 secured to and extending downwardly from right rail 38. Where there is a set or pair of right brackets 30, they may be secured respectively to the left and right sides of right rail 38.

Bumper assembly mounting structure 4 may be a rigid structure which is rigidly secured to and extends downwardly from rails 38 for pivotally mounting thereon bumper assembly 20. Mounting structure 4 and its components (brackets 46, crossbar 90 and plate 25) may be adjacent and rearward of rear end 21 of frame 12, and adjacent and forward of roller 40 and rear end 18 of table top 14/trailer 10. Crossbar 90 (on which tail lights may be mounted) may extend between and be rigidly secured to the left and right rails 38 and extend downward therefrom. Crossbar may extend between and be rigidly secured to the left and right sets of brackets 46 and may extend outwardly to the left of the left set of brackets 46 and outwardly to the right of the right set of brackets 46. Strengthening plate 25 may extend between and be rigidly secured to one of left brackets 46 and one of right brackets 46. Plate 25 may also be rigidly secured to and extend downward and forward from crossbar 90.

Brackets 46 may be rigidly secured to and extend downwardly from rails 38 adjacent and forward of the rear end 18 of table top 14/trailer 10. Brackets 46 may be formed as vertical plates which may be parallel to one another and to brackets/plates 30, 32 and 52. Brackets 46 may include a left bracket or a pair of left brackets 46 secured to and extending downwardly from left rail 38. Where there is a set or pair of left brackets 46, they may be secured respectively to the left and right sides of left rail 38. Similarly, brackets 46 may include a right bracket of a pair of right brackets 46 secured to and extending downwardly from right rail 38. Where there is a set or pair of right brackets 46, they may be secured respectively to the left and right sides of right rail 38. Brackets 46 may be substantially larger than brackets 30, 32 and 52 and may extend from a top or upper end 66 adjacent the respective rail 38 to a bottom or lower end 68 which may be lower than the bottom or lower ends of plates/brackets 30, 31, 32 and 52 and lower than the bottom of rails 19 adjacent rear end 21.

Each support lobe or bracket 46 may include a rear edge 70 which may be an arcuate rear edge and may extend upward and rearward. Edge 70 may as viewed from the side (FIG. 2) be concavely shaped or curved and may primarily face rearward and downwardly. Rearward facing concave edge 70 may extend from generally adjacent top 66 to generally adjacent bottom 68 and may define a cutout or space 72 which may extend from generally adjacent top 66 to generally adjacent bottom 68. Each support lobe or bracket 46 adjacent the bottom end 68 thereof may define an aperture or hole 8 that receives therein shaft 60. Each lobe or bracket 46 adjacent its bottom end 68 may also define a slot 74 which may extend above hole 8 and shaft 60. Slot 74 may be an arcuate slot configured to receive therein shaft 58. Slot 74 may be formed as an arc which is concentric about axis 62 of shaft 60. Slot 74 may be arcuate or may have other shapes, such as, for example, a rectangular shape. Slot 74 may have a first or upper front end 75 and a second or lower rear end 77 and may be elongated therebetween.

Sleeves 35 (FIGS. 2, 5) may be axially or laterally elongated and may have inner and outer diameters which may be essentially the same as the inner and outer diameters of sleeve 37. Left sleeve 35 may extend between and be rigidly secured to the left brackets 30, and right sleeve 35 may extend between and be rigidly secured to the right brackets 30. Left sleeve 35 may extend through holes formed in the left brackets 30 and be welded thereto. Likewise, right sleeve 35 may extend through holes formed in the right brackets 30 and be welded thereto. Sleeve 37 may be directly between left and right sleeves 35 with a left end of sleeve 37 closely adjacent or in contact with a right end of left sleeve 35 and with a right end of sleeve 37 closely adjacent or in contact with a left end of right sleeve 35. Thus, movement of sleeve 37 laterally or in the axial direction may be essentially eliminated or very minimal by the above noted contact or engagement between the ends of sleeve 37 and the ends of sleeves 35. During rotation of table top 14 relative to frame 12, sleeves 35 may rotate relative to sleeve 37 such that the right end of left sleeve 35 slidably engages the left end of sleeve 37 and the left end of right sleeve 35 slidably engages the right end of sleeve 37. Sleeves 35 and sleeve 37 may be aligned with one another or define respective laterally or axially elongated passages which are aligned with and in communication with one another so as to receive therein axle, shaft, rod or pivot pin 34. Pin 34 may be elongated in the axial or lateral direction and may be essentially horizontal. Sleeves 35 may be pinned to or otherwise rigidly or fixedly secured to shaft 34.

Figure 6:
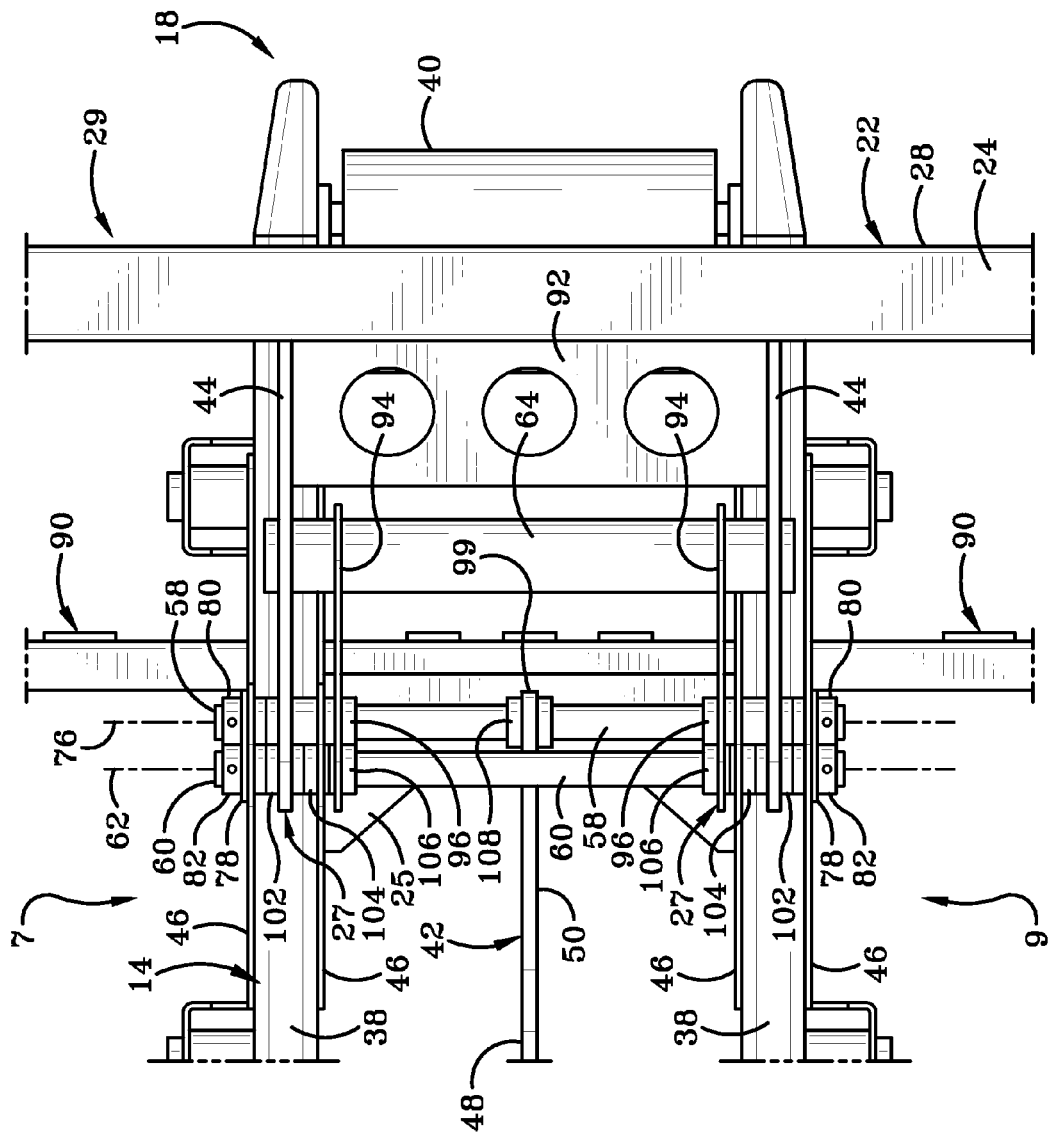
FIG. 6 is an enlarged bottom plan view of a rear portion of the trailer taken on line 6-6 of FIG. 2.

Left and right collars 104 (FIGS. 5-6) may be rigidly secured respectively to the right one of the left brackets 46 and to the left one of the right brackets 46 adjacent lower end 68 of the respective bracket 46. Each collar 104 may define a passage each defining a passage through which shaft 60 may extend or in which shaft 60 may be disposed. Collars 104 may pivot or rotate about shaft 60 and axis 62.

With primary reference to FIGS. 2 and 4-6, bumper assembly 20 may have a front end 27 and a rear or back end 29 which may be adjacent and forward of rear end 18 of trailer 10/table top 14. Bumper assembly 20 may be a rigid structure and may include a bumper 22, left and right support arms 44, a crossbar 64, a support flange 92, left and right support arms 94, left and right sleeves or collars 96, left and right sleeves or collars 102, and left and right sleeves or collars 106. Each of bumper 22, arms 44, crossbar 64, flange 92, arms 94, and collars 96, 102 and 106 may be rigid and formed of an aluminum alloy or another suitable metal. Pivot pin 58 may be received in the passage of collar 96, and pivot pin 60 may be received in collars 102 and 106. Collars 102 and 106 may be pivotable or rotatable about pin 60 and axis 62. Left collar 104 may be directly between left collars 102 and 106, and right collar 104 may be directly between right collars 102 and 106. Left collar 102 may be directly between left collars 82 and 104, and right collar 102 may be directly between right collars 82 and 104. Left collars 102 and 104 may be directly between left collars 82 and 106, and right collars 102 and 104 may be directly between right collars 82 and 106. Bumper 22 may be laterally or axially elongated and may be adjacent or define rear end 29. Bumper 22 may have a first surface 24 and a second surface 28 which extends at an angle to surface 24 and which may be essentially perpendicular to surface 24. Surfaces 24 and 28 may be laterally or axially elongated.

Support arms 44 may be referred to as bumper support arms and may be in the form of plates which may be essentially vertical and longitudinally elongated. Each support arm 44 may be rigidly secured at a rear end thereof to bumper 22 and extend forward therefrom towards a front or forward end 27 of arm 44. Each support arm 44 adjacent the front end thereof may define two apertures, a first one of which may receive therein shaft 58 and second one of which may receive therein an axially elongated rod or shaft 60 which may be parallel to shaft 58. Shaft 60 may extend from the left arm 44 to the right arm 44 and from the left bracket 46 to the right bracket 46. All or a majority of each arm 44 may be forward of the front end of bumper 22, and most of or a majority of each arm 44 may be rearward of the rear end of link 42 although a front portion of each arm 44 may extend forward of the rear end of link 42.

Crossbar 64 may be laterally or axially elongated and may extend between and be rigidly secured to arms or plates 44 and may extend from adjacent the left side of table top 14 to adjacent the right side of table top 14. Crossbar 64 may be essentially parallel to bumper 22 and may be in the form of a hollow tube. Crossbar 64 may be rearward of pins or shafts 58 and 60 and the rear end of frame 12, and may be below table top 14, forward of bumper 22, and rearward of and lower than first leg 48 of link 42 when bumper assembly 22 is in the deployed position (FIG. 2) and in the collapsed position (FIG. 9). Support flange 92 may extend between and be rigidly secured to arms 44 adjacent bumper 22. Flange 92 may be formed of as a plate or bent plate and may be rigidly secured to a front of bumper 22 and extend forward therefrom.

Left and right support arms 94 may be referred to as crossbar support arms and may be in the form of plates which may be essentially vertical and parallel to one another and plates 30, 32, 44, 46 and 52. Left and right support arms 94 may be rigidly secured to crossbar 64 adjacent respective rear ends of support arms 94 and extend forward from crossbar 64. Crossbar 64 may pass through holes formed in support arms 94 and be welded to support arms 94. Crossbar 64 may extend to the left of left plate 94 to a rigid connection with left arm 44 and to the right of right plate 94 to a rigid connection with right arm 44. Left plate 94 may be adjacent and to the right of left arm 44 and the left set of brackets or plates 46, and right plate 94 may be adjacent and to the left of right arm 44 and the right set of brackets or plates 46. Left and right support arms or plates 94 adjacent respective front ends of plates or arms 94 may be rigidly secured respectively to left and right collars 96 and 106 and extend rearward from collars 96 and 106. Each plate 94 may extend between and be rigidly secured to crossbar 64 and the respective collars 96 and 106.

The front portion of left support arm 44 may extend between the left and right brackets of the left set of brackets 46 adjacent their lower ends 68, and the front portion of right support arm 44 may extend between the left and right brackets of the right set of brackets 46 adjacent their lower ends 68. The lower portion of the right bracket of the left set of brackets 46 may extend between the front portion of left support arm 44 and the front portion of left support arm 94, and the lower portion of the left bracket of the right set of brackets 46 may extend between the front portion of right support arm 44 and the front portion of right support arm 94.

Left and right collars 96 may be rigidly secured or fixed respectively to left and right plates or arms 44 and may extend outwardly to the left and right of the given plate or arm 44. Left and right collars 96 may also be rigidly secured or fixed respectively to left and right support arms 94 and may extend outwardly to the left and right of the given plate 94. Thus, left collar 96 may extend between and be rigidly secured to left arm 44 and left plate 94, and right collar 96 may extend between and be rigidly secured to right arm 44 and right plate 94. Collars 96 may pivot or rotate about shaft 58 and rear and/or lower linkage assembly pivot axis 76. Left collar 96 may be adjacent and to the right of left collar 80 such that a left end of left collar 96 may be closely adjacent or in contact with a right end of left collar 80 whereby the left end of left collar 96 may slidably engage the right end of left collar 80 during relative pivotal movement between table top 14 and bumper assembly 20, which may include pivotal movement of table top 14 relative to bumper assembly 20. Right collar 96 may be adjacent and to the left of right collar 80 such that a right end of right collar 96 may be closely adjacent or in contact with a left end of right collar 80 whereby the right end of right collar 96 may slidably engage the left end of right collar 80 during relative pivotal movement between table top 14 and bumper assembly 20, which may include pivotal movement of table top 14 relative to bumper assembly 20.

Left and right collars 102 may be rigidly secured respectively to left and right plates or arms 44 adjacent a front end of the given plate or arm 44 and may extend outwardly to the left and right of the given plate or arm 44. Collars 102 may pivot or rotate about shaft 60 and axis 62. Left collar 102 may be adjacent and to the right of left collar 82 such that a left end of left collar 102 may be closely adjacent or in contact with a right end of left collar 82 whereby the left end of left collar 102 may slidably engage the right end of left collar 82 during relative pivotal movement between collar 102 and collar 82 or between bumper assembly 20 and table top 14/brackets 46. Right collar 102 may be adjacent and to the left of right collar 82 such that a right end of right collar 102 may be closely adjacent or in contact with a left end of right collar 82 whereby the right end of right collar 102 may slidably engage the left end of right collar 82 during relative pivotal movement between collar 102 and collar 82 or between bumper assembly 20 and table top 14/brackets 46.

Bumper assembly 20 may be rotatable or pivotable about shaft 60/axis 62 via collars 102 and 106 being rotatably or pivotally mounted on shaft 60. Left and right collars 106 may be rigidly secured respectively to left and right plates or arms 94 adjacent a front end of the given plate or arm 94 and may extend outwardly to the left and right of the given plate or arm 94. Left collar 106 may be adjacent and to the right of left collar 104 such that a left end of left collar 106 may be closely adjacent or in contact with a right end of left collar 104 whereby the left end of left collar 106 may slidably engage the right end of left collar 104 during relative pivotal movement between collar 106 and collar 104 or between bumper assembly 20 and table top 14/brackets 46. Right collar 106 may be adjacent and to the left of right collar 104 such that a right end of right collar 106 may be closely adjacent or in contact with a left end of right collar 104 whereby the right end of right collar 106 may slidably engage the left end of right collar 104 during relative pivotal movement between collar 106 and collar 104 or between bumper assembly 20 and table top 14/brackets 46.

Left and right links or linking plates 78 may be provided respectively adjacent the lower ends 68 of the left and right set of brackets 46 such that the left link 78 couples or links left collars 80 and 82 to one another and the right link 78 couples or links right collars 80 and 82 to one another. The left link 78 may extend between and be rigidly secured to left collars 80 and 82, and the right link 78 may extend between and be rigidly secured to right collars 80 and 82. Each collar 80 may be rigidly secured to shaft 58, for example, by a pin or otherwise. Likewise, each collar 82 may be rigidly secured to shaft 60, for example, by a pin or otherwise. Thus, each link 78 may couple shaft 58 to shaft 60 via one of collars 80 and one of collars 82. Shafts 58 and 60, left and right collars 80 and 82 and left and right links 78 may be secured to one another so that they are movable together as a unit, for instance, rotatable as a unit about axis 62. Each link 78 may define two apertures which respectively receive therethrough shafts 58 and shaft 60. Each link 78 may be a flat plate which may be essentially parallel to plates 30, 32, 44, 46, 52, and 94. Left link 78 may be adjacent or in contact with the outward-facing or leftward-facing surface of the left one of the left set of brackets 46. Right link 78 may be adjacent or in contact with the outward-facing or rightward-facing surface of the right one of the right set of brackets 46.

The hole 8 in the left or outer bracket 46 of the left set of brackets may receive therein the left collar 82, while the hole 8 in right or inner bracket 46 of the left set of brackets 46 may receive therein the left collar 104. Similarly, the hole 8 in the right or outer bracket 46 of the right set of brackets may receive therein the right collar 82, while the hole 8 in the left or inner bracket 46 of the right set of brackets 46 may receive therein the right collar 104. The slot 74 in the left or outer bracket 46 of the left set of brackets may receive therein the left collar 80, while the right or inner bracket 46 of the left set of brackets 46 may receive therein the left collar 96. Similarly, the slot 74 in the right or outer bracket 46 of the right set of brackets may receive therein the right collar 80, while the left or inner bracket 46 of the right set of brackets 46 may receive therein the right collar 96.

With primary reference to FIGS. 3-6, linkage assembly 6 may include a link 42, upper front collar 84, lower rear collar 108, upper front shaft 54 and lower rear shaft 58. Link 42 may have a first or front upper end 97 and a second or rear lower end 99. Link 42 and collars 84 and 108 may be rigid and formed of a metal such as an aluminum alloy or another metal known in the art. Linkage assembly collar 84 may be rigidly secured to link 42 adjacent front end 97 and linkage assembly collar 108 may be rigidly secured to link 42 adjacent rear end 99. Link 42 may be directly pivotally connected to frame 12 at a front pivotal connection to pivot relative to frame 12 about shaft 54 and front and/or upper linkage assembly pivot axis 56. Link 42 may also be directly pivotally connected to bumper assembly 20 at a rear pivotal connection to pivot relative to bumper assembly about shaft 58 and rear lower axis 76. The front pivotal connection may be provided by rotation of collar 84 about shaft 54 and front upper axis 56 while the rear pivotal connection may be provided by rotation of collar 108 about shaft 58 and rear axis 76. Collar 108 may be directly between and about midway between left and right collars 96 and left and right collars 80 and may be spaced from collars 80 and 96. As viewed from above or below (FIGS. 3, 6), link 42 may be adjacent or lie along a longitudinally extending centerline of trailer 10 midway between left and right sides 7 and 9, and may be about midway between left and right brackets 30, left and right brackets 32, left and right rails 38, left and right arms 44, left and right bracket sets 46, left and right brackets 52, and left and right support arms 94.

Link 42 may include a first leg 48 and a second leg 50. First leg 48 and second leg 50 may be rigidly secured to one another so that link 42 is a generally L-shaped link. Leg 48 may be essentially straight from adjacent front end 97 to adjacent back end 100 thereof, and leg 50 may be essentially straight from adjacent upper front end 100 thereof to adjacent back end 99. Legs 48 and 50 may each be essentially straight such that legs 48 and 50 may define therebetween an angle which may be greater than 90 degrees and less than 180 degrees. Front end 97 may be forward of and adjacent rear end 21 of frame 12 and directly between brackets 52, directly between brackets 30 and directly between brackets 32.

Shaft 34 may extend from adjacent left rail 19L to adjacent right rail 19R; from adjacent left rail 38 to adjacent right rail 38 below rails 38 so that the left end of shaft 34 is to the left of left rail 19L and left rail 38 and the right end of shaft 34 is to the right of right rail 19R and right rail 38; from adjacent left bracket 30 to adjacent right bracket 30 and through respective holes formed in brackets 30; from adjacent left bracket 32 to adjacent right bracket 32 and through respective holes formed in brackets 32; from adjacent left bracket 52 to adjacent right bracket 52 and through respective holes formed in brackets 52; and from and through left collar 35 to and through collar 37 and to and through right collar 35.

Shaft 54 may be adjacent, rearward of and higher than shaft 34. Shaft 54 may extend from adjacent left bracket 52 to adjacent right bracket 52 and through respective holes formed in brackets 52 so that the left end of shaft 54 is adjacent and to the left of left bracket 52 and left collar 86 and to the right of left rail 19L and left rail 38 and the right end of shaft 54 is adjacent and to the right of right bracket 52 and right collar 86 and to the left of right rail 19R and right rail 38. Shaft 54 may pass through holes formed respectively in brackets 54 and link 42 front leg 48 adjacent front end 97 and may extend from and through left collar 86 to and through collar 84 and to and through right collar 86.

Shaft 58 may extend from adjacent lower ends 68 of the left set of brackets 46 to adjacent lower ends 68 of the right set of brackets 46 and outward/leftward to the left of the left set of brackets 46 and outward/rightward to the right of the right set of brackets 46; through brackets 46 adjacent lower ends 68; from adjacent the front ends 27 of left arms 44 and 94 to adjacent the front ends 27 of right arms 44 and 94 and outward/leftward to the left of left arms 44 and 94 and outward/rightward to the right of right arms 44 and 94; through arms 44 and 94 adjacent front ends 27; from adjacent left link 78 to adjacent right link 78 and outward/leftward to the left of the left link 78 and outward/rightward to the right of the right link 78; through left and right links 78; from and through left collars 80 and 96 to and through collar 108 and to and through right collars 80 and 96; and from the left of left rail 19L, left rail 38, left bracket 30, left bracket 32 and left bracket 52 to the right of right bracket 52, right bracket 32, right bracket 30, right rail 38 and right rail 19R.

Shaft 60 may extend from adjacent lower ends 68 of the left set of brackets 46 to adjacent lower ends 68 of the right set of brackets 46 and outward/leftward to the left of the left set of brackets 46 and outward/rightward to the right of the right set of brackets 46; through brackets 46 adjacent lower ends 68; from adjacent the front ends 27 of left arms 44 and 94 to adjacent the front ends 27 of right arms 44 and 94 and outward/leftward to the left of left arms 44 and 94 and outward/rightward to the right of right arms 44 and 94; through arms 44 and 94 adjacent front ends 27; from adjacent left link 78 to adjacent right link 78 and outward/leftward to the left of the left link 78 and outward/rightward to the right of the right link 78; through left and right links 78; from and through left collars 82, 102, 104 and 106 to and through right collars 82, 102, 104 and 106; and from the left of left rail 19L, left rail 38, left bracket 30, left bracket 32 and left bracket 52 to the right of right bracket 52, right bracket 32, right bracket 30, right rail 38 and right rail 19R.

Figure 2:
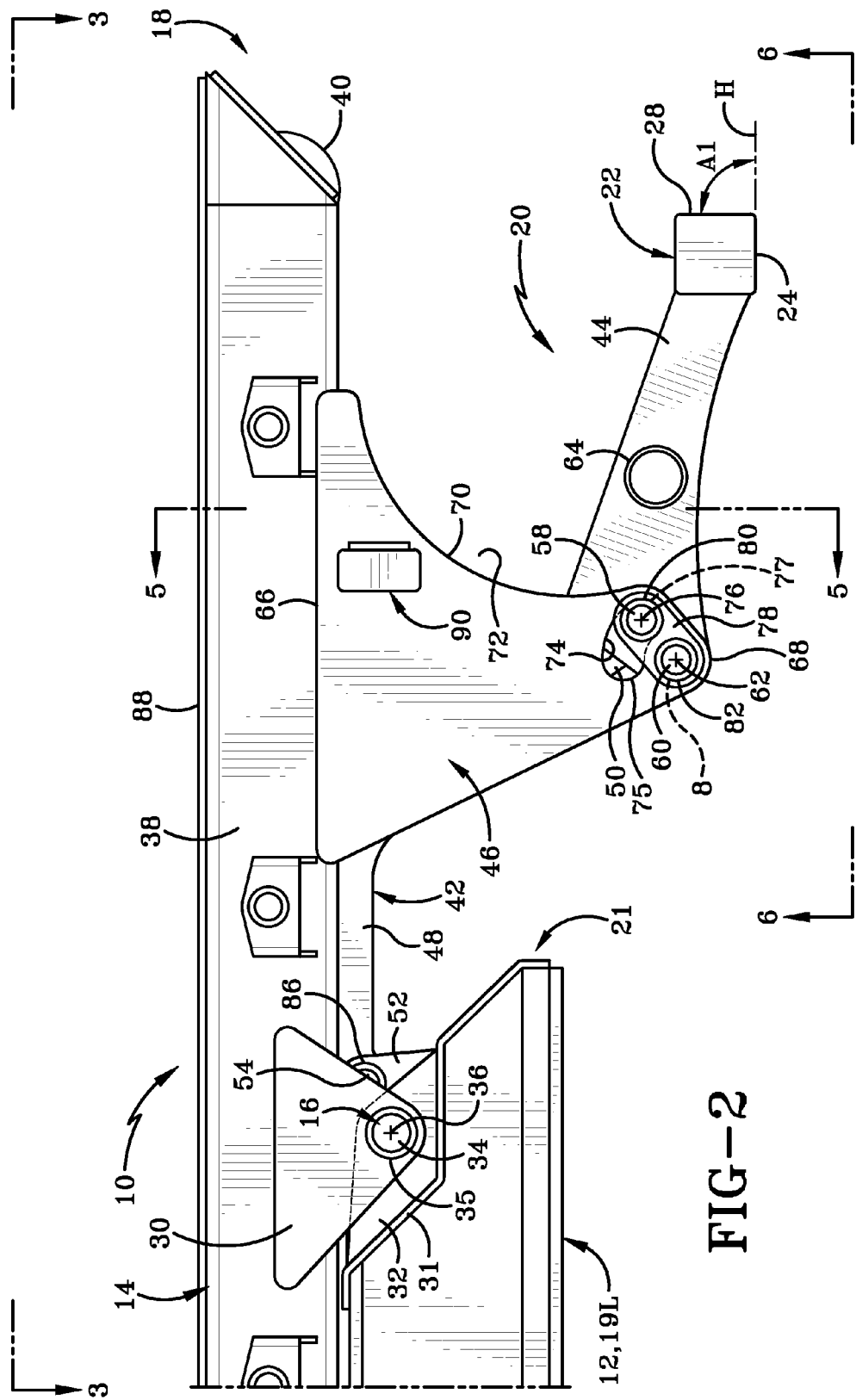
FIG. 2 is an enlarged left side elevation view of a rear portion of the trailer depicting the bumper assembly, a rear portion of the table top, and a rear portion of the frame.

Bumper assembly 20 including bumper 22 and all other components of assembly 20 may be similarly oriented with respect to ground surface 26 in each of the deployed and collapsed positions of the bumper assembly 20. For instance, assembly 20/bumper 22 may have an orientation relative to ground surface 26 or to horizontal H which is essentially the same in the deployed position as in the collapsed position. Thus, for instance, first surface 24 may be similarly oriented with respect to ground surface 26 or to horizontal H in each of the deployed and collapsed positions of the bumper assembly 20. By way of example, first surface 24 may be oriented at a given angle relative to ground surface 26 or to horizontal in each of the deployed and collapsed positions. Likewise, second surface 28 may be similarly oriented with respect to ground surface 26 or to horizontal H in each of the deployed and collapsed positions, or may be oriented at a given angle relative to ground surface 26 or to horizontal H in each of the deployed and collapsed positions. First surface 24 may be an essentially flat bottom downwardly facing surface essentially parallel to the surface 26 of the ground or may be essentially horizontal such that the angle between surface 24 and horizontal H is zero or essentially zero degrees in the deployed and collapsed positions. Surface 28 may be a rearwardly facing surface which may be essentially vertical and essentially perpendicular to ground surface 26 and horizontal H such that the angle A1 between surface 28 and horizontal H is 90 or essentially 90 degrees in the deployed and collapsed positions, as shown in FIGS. 2 and 9. Shafts/pivots 58 and 60 may be similarly oriented with respect to each other in the deployed and collapsed positions of the bumper assembly 20. Likewise, axes 76 and 62 may also be similarly oriented with respect to each other in the deployed and collapsed positions of the bumper assembly 20.

The bumper assembly orientation may also vary somewhat between the deployed and collapsed positions. For instance, bumper assembly 20 may have a first orientation in the deployed position and a second orientation in the collapsed position which is within an angle of 1, 2, 3, 4, 5, 6, 7, 8, 9 or 10 degrees of the first orientation as viewed from a left or right side of the bumper assembly. Thus, by way of example, angle A1 in the deployed position might be 90 degrees and in the collapsed position might be 80 or 100 degrees or anywhere in between.

In the table top home position and bumper assembly deployed position, leg 48 may extend rearward from upper front end 97 and from adjacent pin or shaft 54 and be generally horizontal as viewed from the side (left or right side of leg 48 and trailer 10 or any components thereof) with rear end 100 of leg 48/front end 100 of leg 50 distal, upward and rearward of rear end 21 of frame 12 and plate 31. During movement from the home to the roll off position and from the deployed to the collapsed position, rear/front end 100 moves downward and forward closer to rear end 21 of frame 12/plate 31 so that in the roll off position and collapsed position, leg 48 may be tilted or angled as viewed from the side to extend downward and rearward with rear end 100 adjacent and rearward of rear end 21 of frame 12 and plate 31 and generally parallel to table top 14/rails 38. In the home and deployed positions, rear/lower leg 50 at the forward end 100 thereof may be rigidly secured to rear end 100 of front/upper leg 48 and extend or angle downward and rearward from its connection with leg 48 to lower rear end 99 of link 42/leg 50 such that rear end 99 of leg 50 is rearward of and lower than front end 97 and rear end 100. In the roll off and collapsed positions, leg 50 may extend or angle downward and forward from rear/lower end 100 of leg 48 such that rear end 99 of leg 50 may be forward of and lower than (or directly below) rear end 100 and rearward of and lower than front end 97. In the home and deployed positions, front end 27 of bumper assembly 20, lower ends 68 of brackets 46 and slots 74 may be rearward of and lower than front end 97 and rear end 100 and rear end 21 of frame 12. In the roll off and collapsed positions, front end 27 of bumper assembly 20, lower ends 68 of brackets 46 and slots 74 may be forward of and lower than (or directly below as viewed from the side) rear end 100 and rear end 21 and rearward of and lower than front end 97.

In the home and deployed positions as well as the roll off and collapsed positions, shaft 60/axis 62 may be lower than, adjacent and forward of shaft 58/axis 76, lower than first leg 48 of link 42, adjacent lower end 99 of leg 50/link 42, lower than or below table top 14, forward of bumper 22 and rear end 18 and rearward of the rear end of frame 12; and shaft 58/axis 76 may be lower than first leg 48 of link 42, adjacent the lower end of leg 50/link 42, lower than or below table top 14, forward of bumper 22 and rear end 18 and rearward of the rear end of frame 12. In the home and deployed positions, shafts 58 and 60 and axes 62 and 76 may be rearward of rear end 21 of frame 12 and rear end 100 of leg 48. In the roll off and collapsed positions, shafts 58 and 60 and axes 62 and 76 may be directly below or forward of rear end 21 and rear end 100 of leg 48.

In the home position (FIGS. 1, 4) of table top 14, linkage assembly pivot axis 56 may be adjacent, rearward of and higher than axis 36; axis 62 and axis 76 may be distal, rearward of and lower than axis 36 and axis 56; and axis 76 may be adjacent, rearward of and higher than axis 62. In the roll off position (FIGS. 7, 9) of table top 14, axis 56 may be adjacent, rearward of and higher than axis 36; axis 62 and axis 76 may be distal, rearward of and lower than axis 36 and axis 56; and axis 76 may be adjacent, rearward of and higher than axis 62. Axis 36 and axis 56 may be at the same or essentially same respective positions in the tilted roll off position of table top 14 as in the home position of table top 14. Axis 62 and axis 76 may be at respective positions in the tilted roll off position of table top 14 which are substantially forward of and substantially lower than their respective positions in the home position of table top 14. Pivot 60/axis 62 and pivot 58/axis 76 may be spaced rearward of and distal rear end 21 of frame 12 in the home and deployed positions and may be spaced downward of and distal rear end 21 directly below and/or forward of rear end 21 and the rear portion of rails 19 in the roll off position of table top 14.

The operation of trailer 10 is now discussed beginning with primary reference to FIG. 7, which illustrates the unloading of a container 110 from table top 14. It will be understood that container 110 may have been seated atop table top 14 in the home position of FIG. 1 prior to the stage shown in FIG. 7. To unload container 110, an actuating lift arm 112 is moved upward in the direction of Arrow A, causing table top 14 to pivot in the direction of Arrow B about pivotal connection 16/pivot 34/axis 36 to move table top 14 from the home position to the roll off position, thereby raising front end 23 of table top 14 and lowering rear end 18 of table top 14 relative to frame 12 and ground surface 26, and moving container 110 atop table top 14 from a generally horizontal position to the tilted position shown in FIG. 7. Simultaneous to the pivoting of table top 14 from the home position to the roll off position, table top 14 and bumper assembly 20 may undergo relative pivotal movement about axis 62 from the deployed position to the collapsed position of bumper assembly 20. Table top 14 may pivot relative to bumper assembly 20 about axis 62 to provide the change from the deployed to the collapsed position.

With table top 14 in the roll off position, container 110 may then be lowered in the direction of Arrow C (essentially parallel to the top surface of table top 14 in the roll off position) via an actuator assembly (not shown but incorporated by reference and described in the two aforementioned co-filed applications). FIG. 7 may also depict the loading of container 110 by movement of container 110 in the direction opposite Arrow C, with actuator 112 then being operated to move in a lowering direction opposite Arrow A to pivot table top 14 about axis 36 in a direction opposite Arrow B to move table top 14 from the roll off position to the home position, thereby lowering front end 23 of table top 14 and raising rear end 18 of table top 14 and moving container 110 atop table top 14 from the tilted position to the generally horizontal position.

Figure 8:
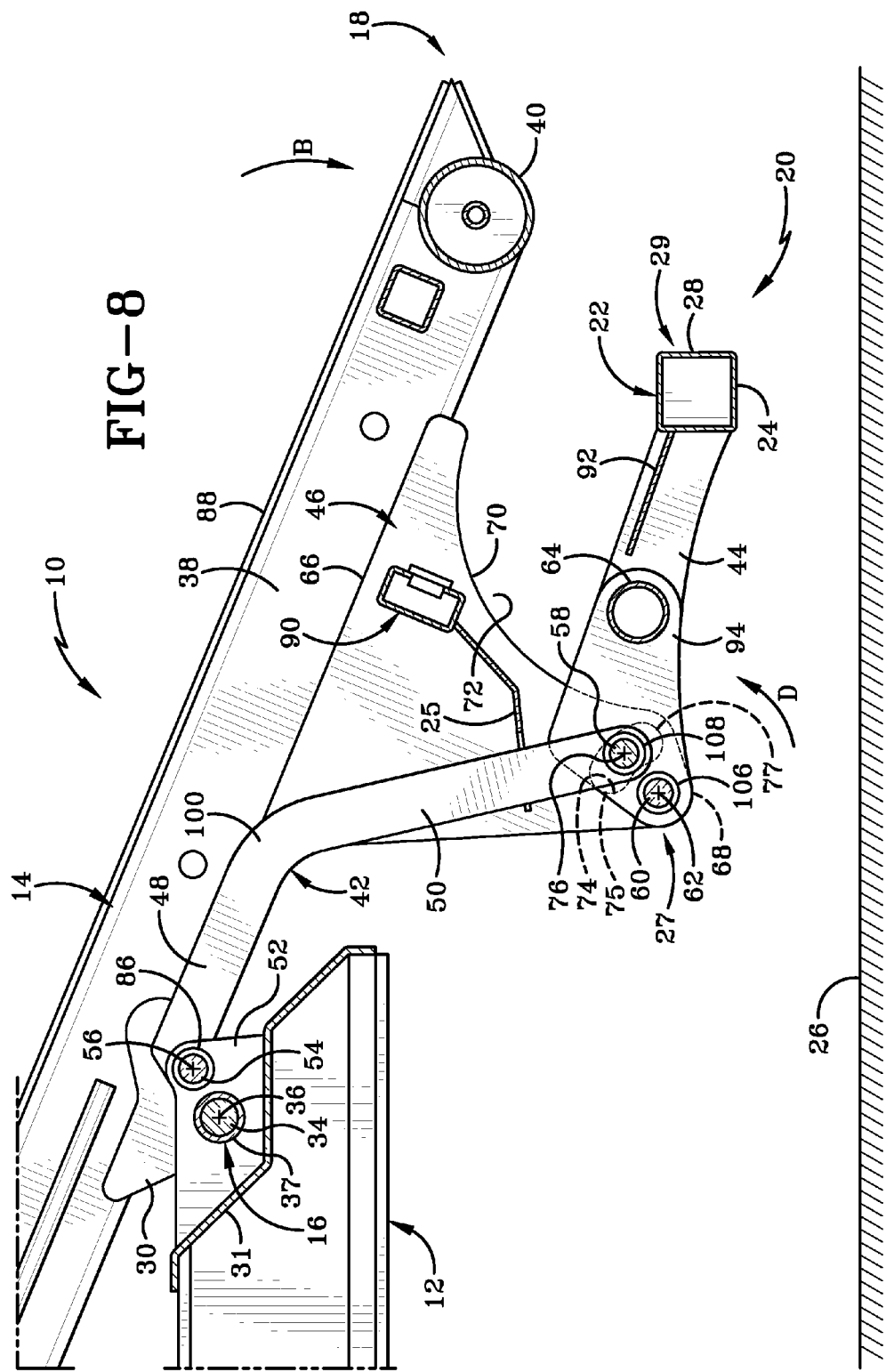
FIG. 8 is a cross section view similar to FIG. 4 showing the table top moving from the home position toward the roll off position and the bumper assembly moving from the deployed position toward the collapsed position.

With reference to FIGS. 8 and 9, as table top 14 rotates around pivot connection 16/axis 36 in the direction of Arrow B from the home position (FIG. 4) to the roll off position (FIG. 9), rear end 18 of table top 14 pivots downward about axis 62 relative to components of the bumper assembly 20 which are rearward of axis 62 so that rear end 18 and bumper 22 move closer to one another such that rear end 18 and bumper 22 are closer to one another in the roll off position than in the home position. Bumper 22 may have a distal position in which bumper 22 is distal and lower than rear end 18 in the home and collapsed positions and a proximate position in which bumper 22 is adjacent rear end 18 and may extend higher than rear end 18 (partially or entirely higher than rear end 18).

Bumper assembly 20 may maintain an essentially constant or same orientation relative to ground surface 26 and to horizontal H throughout the table top 14 movement from the home to the roll off position and bumper assembly 20 movement from the deployed to the collapsed position such that bumper 22 and other components rearward of axis 62 may not pivot upward relative to rear end 18 although bumper 22 and said components of bumper assembly 20 may be said to or appear to be raised, lifted or moved upward in the direction of Arrow D relative to the rear portion/rear end 18 of table top 14. The components of bumper assembly 20 which are rearward of axis 62 may include bumper 22, the rear ends/rear portions of arms 44 and 94 (a majority of arms 44 and 94), crossbar 64 and flange 92. During this pivotal movement of bumper assembly 20, bumper assembly 20 in its entirety (all components of bumper assembly 20) may move forward and downward or towards the ground/ground surface 26 in the direction of Arrow B as bumper assembly 20 is carried forward and downward with the forward and downward movement of rear end 18/rear portion of table top 14. Bumper assembly 20 is thus higher and further rearward in the home and deployed position than in the roll off and collapsed positions although all components of bumper assembly may remain out of contact and spaced above ground 26 in the roll off and collapsed (and all) positions. Given the above noted example of an essentially constant orientation of bumper assembly 20, first surface 24 may remain essentially horizontal or parallel to ground surface 26 and rear surface 28 may remain essentially vertical or perpendicular to ground surface 26 throughout the pivotal movement of table top 14. In the home and deployed positions, front end 27 of bumper assembly 20 and bottom ends 68 of brackets 46 may be rearward of and lower than rear end 21 of frame 12/rails 19, whereas in the roll off and collapsed positions, front end 27 of bumper assembly 20 and bottom ends 68 of brackets 46 may be forward of and lower than (or directly below) rear end 21 of frame 12/rear portion of rails 19.

Also during and as a result of the movement of table top from the home position to the roll off position and bumper assembly from the deployed position to the collapsed position, rear end 99 of linkage assembly 6, leg 50, rear end 100 of leg 48, and pivot 58/axis 76 may pivot about axis 56 of pivot 54 downward and forward relative to frame 12 and ground surface 26; rear end 18/the rear portion of table top 14 (i.e., the portion of table top 14 rearward of axis 56) may move downward and forward relative to frame 12, ground surface 26, and legs 48 and 50 of link 42 (or the portion of link 42 rearward of axis 56); and roller 40 may move downward and forward from a raised position spaced upwardly of and distal ground surface 26 to a lowered position adjacent or in contact with ground surface 26.

Figure 4:
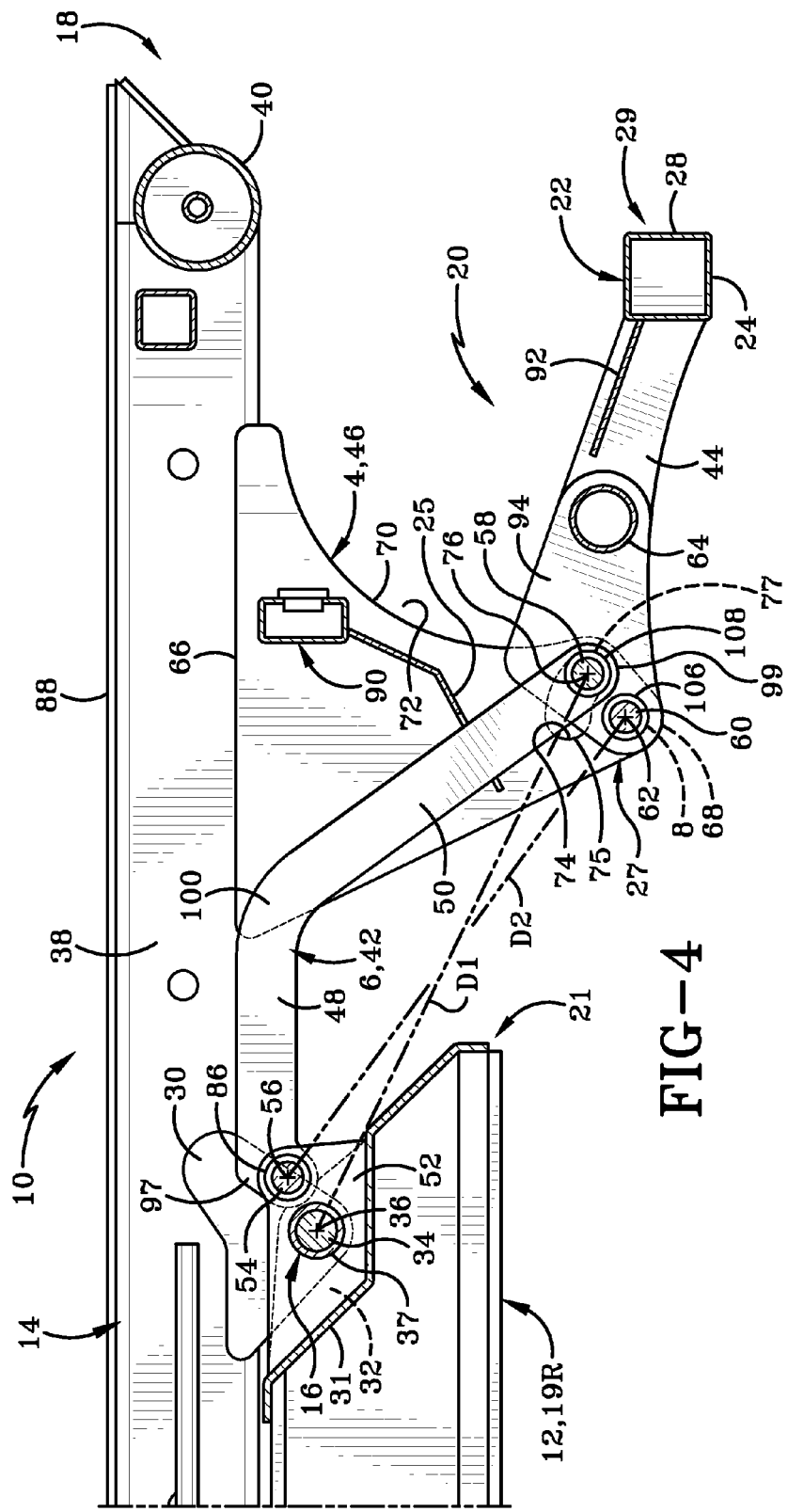
FIG. 4 is an enlarged cross section view taken on line 4-4 of FIG. 3.

As table top 14 pivots from the home position to the roll off position and bumper assembly 20 moves from the deployed position to the collapsed position, the normal distance between axis 36 and axis 76 may change and decrease while the normal distance between axis 56 and axis 62 may change and increase, as illustrated in FIGS. 4 and 9. FIG. 4 shows a normal distance D1 between axis 36 and axis 76 in the home position of table top 14 and deployed position of bumper assembly 20, and FIG. 9 shows a normal distance D3 between axis 36 and axis 76 in the roll off position of table top 14 and collapsed position of bumper assembly 20, wherein distance D3 may be different and smaller than distance D1. FIG. 4 also shows a normal distance D2 between axis 56 and axis 62 in the home position of table top 14 and deployed position of bumper assembly 20, and FIG. 9 shows a normal distance D4 between axis 56 and axis 62 in the roll off position of table top 14 and collapsed position of bumper assembly 20, wherein distance D4 may be different and greater than distance D2.

Meanwhile, the normal distance between axis 36 and axis 56 may be fixed or constant, the normal distance between axis 36 and axis 62 may be fixed or constant, the normal distance between axis 56 and axis 76 may be fixed or constant, and the normal distance between axis 62 and axis 76 may be fixed or constant, whereby each of these normal fixed distances may be the same in the home and roll off (and all) positions of table top 14 and the deployed and collapsed (and all) positions of bumper assembly 20.

As rear end 18/rear portion of table top 14 including brackets 46 move downward and forward during the pivotal movement from the home to the deployed position, shafts 58 and 60 likewise move downward and forward as they are carried by table top 14 rear portion/brackets 46. During pivotal movement of table top 14 from the home position to the roll off position and pivotal movement of bumper assembly 20 from the deployed position to the collapsed position, rear end 18/the rear portion of table top 14 including brackets 46 and slots 74 may pivot about axis 62 relative to bumper assembly 20, pivot 58, axis 76 and collars 80 and 96 so that slots 74 move relative to pivot 58, axis 76 and collars 80 and 96 while pivot 58 is within all four slots 74 and the collars 80 and 96 are within the respective slots 74 detailed earlier. Thus, for instance, pivot 58 may have a first pivot/shaft position within each slot 74 in which pivot/shaft 58 is adjacent end 77 and distal end 75 of each slot 74 in the home and deployed positions (FIG. 4) and a second pivot/shaft position in which pivot/shaft 58 is adjacent end 75 and distal end 77 of each slot 74 in the roll off and collapsed positions. In addition, sleeves/collars 80 and 96 may have a first sleeve or collar position in which the given sleeve or collar is adjacent or in contact with end 77 and distal end 75 of the respective slot 74 in the home and deployed positions (FIG. 4) and a second sleeve or collar position in which the given sleeve or collar is adjacent or in contact with end 75 and distal end 77 of the respective slot 74 in the roll off and collapsed positions.

A portion of bumper assembly 20, which may be a portion of crossbar 64, may move from outside each cutout or space 72 into each cutout or space 72 during movement from the home and deployed positions (FIG. 4) to the roll off and collapsed positions (FIG. 9). Thus, said portion(s) may be within each cutout or space 72 when table top 14/bumper assembly 20 are in the roll off/collapsed positions and outside each cutout or space 72 when table top 14/bumper assembly are in the home/deployed positions.

Linkage assembly 6 may control the orientation/position/movement of bumper assembly 20 as table top 14 moves from the home position to the roll off position and the bumper assembly moves from the deployed position to the collapsed position (and as table top 14 moves from the roll off position to the home position and the bumper assembly moves from the collapsed position to the deployed position). Linkage assembly 6 may hold bumper assembly 20 in essentially the same orientation throughout movement of table top between the home and roll off positions, or for instance, control bumper assembly 20 within the angle of 1-10 degrees difference between the deployed and collapsed positions as discussed further above.

It is noted that any of the axes 36, 56, 62 and 76 may referred to as a first axis, second axis, third axis or fourth axis. Likewise, other components or terms which have the same name (e.g. and without limitation, brackets, plates, pivots, shafts, positions, support arms, links) may be modified with first or second or third or fourth, etc. (e.g., first bracket, second bracket, third bracket, etc., first pivot, second pivot, third pivot, etc., first position, second position, third position, etc.).

In the foregoing description, certain terms have been used for brevity, clearness, and understanding. No unnecessary limitations are to be implied therefrom beyond the requirement of the prior art because such terms are used for descriptive purposes and are intended to be broadly construed. Moreover, the description and illustrations are an example and not limited to the exact details shown or described.

The invention claimed is:
1. A roll off trailer comprising:
a trailer frame having a rear end;
a table top pivotally connected to the trailer frame adjacent the rear end so that the table top is pivotable between a generally horizontal home position and a tilted roll off position;
a bumper assembly which extends below the table top adjacent the rear end of the trailer frame and is movable between a deployed position and a collapsed position; and
a linkage assembly which is mounted on the bumper assembly and controls orientation of the bumper assembly as the table top moves from the home position to the roll off position and the bumper assembly moves from the deployed position to the collapsed position; wherein the linkage assembly extends between and is mounted on the trailer frame and bumper assembly.

2. The trailer of claim 1 wherein the linkage assembly is pivotally connected to the trailer frame and pivotally connected to the bumper assembly.

3. The trailer of claim 2 wherein the bumper assembly comprises a bumper and a support arm extending forward from the bumper; and the linkage assembly is pivotally connected to the bumper assembly via a pivot shaft which extends between the support arm and the linkage assembly.

4. The trailer of claim 3 further comprising
a first collar adjacent the support arm;
a link of the linkage assembly extending from adjacent the trailer frame to adjacent the pivot shaft; and
a second collar adjacent the link;
wherein the pivot shaft is received in the first and second collars.

5. The trailer of claim 1 wherein the linkage assembly extends forward of a front end of the bumper assembly; and the bumper assembly is pivotally connected to the table top by a first pivot and pivotally connected to the linkage assembly by a second pivot.

6. The trailer of claim 1 wherein the bumper assembly comprises a bumper, a left support arm extending forward from the bumper and a right support arm extending forward from the bumper; and further comprising
a first pivot shaft by which the bumper assembly is pivotally connected to the table top, the first pivot shaft extending from adjacent a front end of the left support arm to adjacent a front end of the right support arm; and
a second pivot shaft adjacent and essentially parallel to the first pivot shaft, the second pivot shaft extending from adjacent the front end of the left support arm to adjacent the front end of the right support arm.

7. The trailer of claim 1 wherein the bumper assembly has a first orientation in the deployed position and a second orientation in the collapsed position which is within an angle of 10 degrees of the first orientation as viewed from a left side of the bumper assembly.

8. The trailer of claim 1 wherein the linkage assembly is pivotally connected to the trailer frame about a first linkage assembly pivot axis and pivotally connected to the bumper assembly about a second linkage assembly pivot axis.

9. The trailer of claim 1 wherein the bumper assembly is pivotally connected to the table top about a bumper assembly pivot axis; and the linkage assembly is pivotally connected to the bumper assembly about a first linkage assembly pivot axis.

10. The trailer of claim 9 wherein the linkage assembly is pivotally connected to the trailer frame about a second linkage assembly pivot axis.

11. The trailer of claim 1 wherein the table top is pivotally connected to the trailer frame about a first axis adjacent the rear end of the trailer frame; the bumper assembly is pivotally connected to the table top about a second axis; and the linkage assembly is pivotally connected to the trailer frame about a third axis and pivotally connected to the bumper assembly about a fourth axis.

12. The trailer of claim 11 wherein the first axis is adjacent the third axis; and the second axis is adjacent the fourth axis.

13. The trailer of claim 11 wherein the first axis and fourth axis define therebetween a first normal distance when the bumper assembly is in the deployed position and the table top is in the home position and a second normal distance when the bumper assembly is in the collapsed position and the table top is in the roll off position;

the second normal distance is different than the first normal distance;

the second axis and third axis define therebetween a third normal distance when the bumper assembly is in the deployed position and the table top is in the home position and a fourth normal distance when the bumper assembly is in the collapsed position and the table top is in the roll off position; and the third normal distance is different than the fourth normal distance.

14. A roll off trailer comprising:

a trailer frame having a rear end;

a table top pivotally connected to the trailer frame adjacent the rear end so that the table top is pivotable between a generally horizontal home position and a tilted roll off position;

a bumper assembly which extends below the table top adjacent the rear end of the trailer frame and is movable between a deployed position and a collapsed position; and a linkage assembly which is mounted on the bumper assembly and controls orientation of the bumper assembly as the table top moves from the home position to the roll off position and the bumper assembly moves from the deployed position to the collapsed position;

wherein the bumper assembly is pivotally connected to the table top about a bumper assembly pivot axis; and the linkage assembly is pivotally connected to the bumper assembly about a first linkage assembly pivot axis; and further comprising an elongated slot formed in the table top and spaced from the bumper assembly pivot axis; and a pivot which defines the first linkage assembly pivot axis and which has first and second positions within the slot.

15. A roll off trailer comprising:

a trailer frame having a rear end;

a table top pivotally connected to the trailer frame adjacent the rear end so that the table top is pivotable between a generally horizontal home position and a tilted roll off position;

a bumper assembly which extends below the table top adjacent the rear end of the trailer frame and is movable between a deployed position and a collapsed position; and a linkage assembly which is mounted on the bumper assembly and controls orientation of the bumper assembly as the table top moves from the home position to the roll off position and the bumper assembly moves from the deployed position to the collapsed position;

wherein the table top comprises a bumper assembly mounting bracket having a rear edge which defines a cutout; and a portion of the bumper assembly is outside the cutout in the deployed position and within the cutout in the collapsed positioned.

16. A roll off trailer comprising:

a trailer frame having a rear end;

a table top pivotally connected to the trailer frame adjacent the rear end so that the table top is pivotable between a generally horizontal home position and a tilted roll off position;

a bumper assembly which extends below the table top adjacent the rear end of the trailer frame and is movable between a deployed position and a collapsed position; and a linkage assembly which is mounted on the bumper assembly and controls orientation of the bumper assembly as the table top moves from the home position to the roll off position and the bumper assembly moves from the deployed position to the collapsed position;

wherein the bumper assembly comprises a bumper, a left support arm extending forward from the bumper and a right support arm extending forward from the bumper;

a pivot shaft extends from adjacent the left support arm to adjacent the right support arm; and the linkage assembly is pivotally connected to the bumper assembly via the pivot shaft.

17. The trailer of claim 16 wherein the linkage assembly is pivotally connected to the bumper assembly via a linkage assembly collar which receives therein the pivot shaft;

the bumper assembly comprises a left collar which is adjacent the left support arm and receives therein the pivot shaft; and the bumper assembly comprises a right collar which is adjacent the right support arm and receives therein the pivot shaft.

18. A roll off trailer comprising:

a trailer frame having a rear end;

a table top pivotally connected to the trailer frame about a first axis adjacent the rear end;

a bumper assembly pivotally connected to the table top about a second axis; and a linkage assembly pivotally connected to the trailer frame about a third axis and pivotally connected to the bumper assembly about a fourth axis.

19. The trailer of claim 18 wherein the second axis and third axis define therebetween a first normal distance when the bumper assembly is in the deployed position and the table top is in the home position and a second normal distance when the bumper assembly is in the collapsed position and the table top is in the roll off position; and the first normal distance is different than the second normal distance.

20. A method comprising the steps of:

providing a roll off trailer comprising a trailer frame, a table top pivotally connected to the trailer frame adjacent a rear end of the trailer, a bumper assembly comprising a bumper, and a linkage assembly pivotally connected to the trailer frame and pivotally connected to the bumper assembly; and pivoting the table top relative to the trailer frame so that a rear end of the table top moves downward relative to the trailer frame and so that the bumper and rear end of the table top move closer to one another.

21. The method of claim 20 wherein the bumper and rear end of the table top move closer to one another as a result of the pivoting of the table top.

* * * * *